United States Patent
Rao

(10) Patent No.: US 11,610,364 B2
(45) Date of Patent: Mar. 21, 2023

(54) METHOD, DEVICE, AND STORAGE MEDIUM FOR APPLYING LIGHTING TO A RENDERED OBJECT IN A SCENE

(71) Applicant: BEIJING DAJIA INTERNET INFORMATION TECHNOLOGY CO., LTD., Beijing (CN)

(72) Inventor: Chao Rao, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/713,936

(22) Filed: Apr. 5, 2022

(65) Prior Publication Data

US 2022/0230385 A1    Jul. 21, 2022

Related U.S. Application Data

(63) Continuation of application No. PCT/CN2021/105537, filed on Jul. 9, 2021.

(30) Foreign Application Priority Data

Sep. 27, 2020  (CN) .......................... 202011029426.1

(51) Int. Cl.
*G06T 15/50*    (2011.01)
*G06T 15/80*    (2011.01)
*G06T 7/90*     (2017.01)

(52) U.S. Cl.
CPC .............. *G06T 15/506* (2013.01); *G06T 7/90* (2017.01); *G06T 15/80* (2013.01); *G06T 2207/10024* (2013.01)

(58) Field of Classification Search
CPC .............................. G06T 15/50; G06T 15/506
See application file for complete search history.

(56) References Cited

U.S. PATENT DOCUMENTS

| | | | |
|---|---|---|---|
| 2016/0155261 A1* | 6/2016 | Iborra ..................... | G06T 15/04 345/426 |
| 2019/0012828 A1* | 1/2019 | Jung ....................... | G06T 15/205 |

(Continued)

FOREIGN PATENT DOCUMENTS

| | | |
|---|---|---|
| CN | 101246600 A | 8/2008 |
| CN | 106652013 A | 5/2017 |

(Continued)

OTHER PUBLICATIONS

International Search Report issued in Application No. PCT/CN2021/105537, dated Sep. 28, 2021 (8 pages).

(Continued)

*Primary Examiner* — Ryan McCulley
(74) *Attorney, Agent, or Firm* — Osha Bergman Watanabe & Burton LLP

(57) ABSTRACT

The disclosure relates to a method for processing an image. The method includes: obtaining a colorized image of a light-receiving object in a current scene; obtaining a target position of the light-receiving object in a camera coordinate system based on a current position of the light-receiving object in an image coordinate system of the current scene; obtaining a lighting-color map of the imaging device; and (Continued)

obtaining a lighting image of the light-receiving object by processing the colorized image based on the target position and the lighting-color map of the imaging device.

14 Claims, 4 Drawing Sheets

(56) References Cited

U.S. PATENT DOCUMENTS

2019/0362540 A1* 11/2019 Chen .................... G06T 19/006
2019/0378327 A1   12/2019 Kunkel et al.

FOREIGN PATENT DOCUMENTS

| CN | 107016718 A | 8/2017 |
| CN | 107730578 A | 2/2018 |
| CN | 107871339 A | 4/2018 |
| CN | 108804061 A | 11/2018 |
| CN | 110021071 A | 7/2019 |
| CN | 110533707 A | 12/2019 |
| CN | 111127624 A | 5/2020 |
| CN | 111932641 A | 11/2020 |

OTHER PUBLICATIONS

Written Opinion issued in International Application No. PCT/CN2021/105537, dated Sep. 28, 2021 (5 pages).
Office Action issued in Chinese Application No. 202011029426.1, dated Nov. 23, 2020 (16 pages).
Office Action issued in Chinese Application No. 202011029426.1, dated Dec. 15, 2020 (21 pages).
Office Action issued in Chinese Application No. 202011029426.1, dated Jan. 11, 2021 (15 pages).
Notification to Grant issued in Chinese Application No. 202011029426.1, dated Apr. 19, 2021 (7 pages).
Tan, Ming; "Consistent Illumination in Visual-Based Augmented Reality;" China Master's Theses Full-text Database, Information Technology; Jan. 31, 2010 (73 pages).
Yuan et al.; "A Framework for Lighting Detection and Scene Rendering in AR Environment;" Journal of Computer-Aided Design & Computer Graphics; vol. 18; No. 8; Aug. 2006 (6 pages).

* cited by examiner

METHOD, DEVICE, AND STORAGE MEDIUM FOR APPLYING LIGHTING TO A RENDERED OBJECT IN A SCENE

CROSS-REFERENCE TO RELATED APPLICATION

The disclosure is a continuation application of International Application No. PCT/CN2021/105537 file on Jul. 9, 2021, which claims priority to Chinese Patent Application No. 202011029426.1, filed on Sep. 27, 2020, the entire content of which is incorporated herein by reference.

TECHNICAL FIELD

The disclosure relates to the field of data processing technologies, and more particularly, to a method and a device for processing an image.

BACKGROUND

In the related art, requirements on photorealistic rendering are increasing as applications having rendering requirements such as games, virtual reality (VR) and augmented reality (AR) popularized. To enhance the photorealistic rendering, a lighting processing of a light source is introduced into a rendering process.

SUMMARY

According to some embodiments of the disclosure, a method for processing an image is provided. The method includes: obtaining a colorized image of a light-receiving object in a current scene by performing a shading operation on the light-receiving object; obtaining a target position of a current position of the light-receiving object in a camera coordinate system based on the current position of the light-receiving object in an image coordinate system of the current scene, in which an imaging direction of an imaging device points to a lighting direction of a light source in the current scene, and the light-receiving object is located in an imaging range of the imaging device; obtaining a lighting-color map of the imaging device, in which the lighting-color map is generated based on attributes of the light source in the current scene, and the lighting-color map is configured to represent a lighting situation of the light source in the current scene; and obtaining a lighting image of the light-receiving object by processing the colorized image based on the target position and the lighting-color map of the imaging device, in which the lighting image is an image reflecting a display effect of the light-receiving object after being lighted by the light source.

According to some embodiments of the disclosure, an electronic device is provided. The electronic device includes: a processor and a memory for instructions executable by the processor. The processor is configured to execute the instructions to perform: obtaining a colorized image of a light-receiving object in a current scene by performing a shading operation on the light-receiving object; obtaining a target position of a current position of the light-receiving object in a camera coordinate system based on the current position of the light-receiving object in an image coordinate system of the current scene, in which an imaging direction of an imaging device points to a lighting direction of a light source in the current scene, and the light-receiving object is located in an imaging range of the imaging device; obtaining a lighting-color map of the imaging device, in which the lighting-color map is generated based on attributes of the light source in the current scene, and the lighting-color map is configured to represent a lighting situation of the light source in the current scene; and obtaining a lighting image of the light-receiving object by processing the colorized image based on the target position and the lighting-color map of the imaging device, in which the lighting image is an image reflecting a display effect of the light-receiving object after being lighted by the light source.

According to some embodiments of the disclosure, a non-transitory computer-readable storage medium is provided, and the non-transitory computer-readable storage medium has instructions stored therein. When the instructions in the storage medium are executed by a processor, the processor is caused to perform: obtaining a colorized image of a light-receiving object in a current scene by performing a shading operation on the light-receiving object; obtaining a target position of a current position of the light-receiving object in a camera coordinate system based on the current position of the light-receiving object in an image coordinate system of the current scene, in which an imaging direction of an imaging device points to a lighting direction of a light source in the current scene, and the light-receiving object is located in an imaging range of the imaging device; obtaining a lighting-color map of the imaging device, in which the lighting-color map is generated based on attributes of the light source in the current scene, and the lighting-color map is configured to represent a lighting situation of the light source in the current scene; and obtaining a lighting image of the light-receiving object by processing the colorized image based on the target position and the lighting-color map of the imaging device, in which the lighting image is an image reflecting a display effect of the light-receiving object after being lighted by the light source.

It should be understood that the above general description and the following detailed description are only exemplary and explanatory, and may not limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

In order to make those skilled in the art better understand the technical solution of the disclosure, the technical solution in embodiments of the disclosure will be clearly and completely described below with reference to the accompanying drawings.

It should be noted that the terms "first", "second" and the like in the description and claims of the disclosure and the above drawings are used to distinguish similar objects, and are not necessarily used to describe a specific sequence or a precedence sequence. It is to be understood that the data so used may be interchanged under appropriate circumstances, so that embodiments of the disclosure described herein can be practiced in sequences other than those illustrated or described herein. The implementations described in the following examples are not intended to represent all implementations consistent with this disclosure. Rather, they are merely examples of apparatus and methods consistent with some aspects of the disclosure, as recited in the appended claims. It should be noted that, all the embodiments of the disclosure may be implemented independently or in combination with other embodiments, which are not limited in the disclosure.

To enhance the photorealistic rendering, a lighting processing of a light source is introduced into a rendering process. The impact of the light source on the photorealistic rendering is reflected in the following two aspects.

In the first aspect, changes of attributes such as a position of the light source and an orientation of the light source may affect a lighting map from the light source to an object lighted by the light source (referred to as a light-receiving object). In the second aspect, the light-receiving object enters a lighting range of the light source and may be affected by lighting, which may affect the photorealistic rendering, especially the photorealistic rendering of the light-receiving object.

Figure 1:
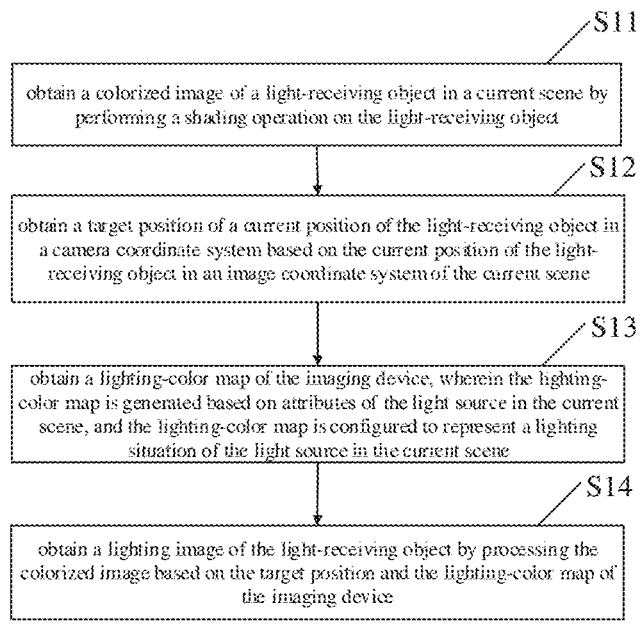
FIG. 1 is a flowchart of a method for processing an image according to an embodiment.

FIG. 1 is a flowchart of a method for processing an image according to an embodiment. As shown in FIG. 1, the method for processing the image can be applied to an electronic device. The electronic device can be, but is not limited to, a device that can run games, VR and AR applications such as a mobile phone, a tablet computer and a wearable device, or a background device that provide games, VR and AR applications. As shown in FIG. 1, the method may include the following S11, S12, S13 and S14.

In S11, a colorized image of a light-receiving object in a current scene is obtained by performing a shading operation on the light-receiving object.

In some embodiments, the colorized image is obtained by performing the shading operation on the light-receiving object, so that the shading effect of the light-receiving object can be reflected through the colorized image. It can be understood that the light-receiving object is an object in the current scene and lighted or illuminated by the light source in the current scene, and the light-receiving object may be a virtual object in the current scene, such as a virtual character and a virtual animal. Generally, the light-receiving object in the current scene is a three-dimensional object including polygons. After a three-dimensional model of the light-receiving object is obtained, various objects can be represented by performing the shading operation on the three-dimensional model. The shading operation includes but is not limited to flat shading and Gouraud shading, to obtain the colorized image of the light-receiving object through the shading operation.

In S12, a target position of a current position of the light-receiving object in a camera coordinate system is obtained based on the current position of the light-receiving object in an image coordinate system of the current scene, in which an imaging direction of an imaging device points to a lighting direction of a light source in the current scene, and the light-receiving object is located in an imaging range of the imaging device.

In some embodiments of the disclosure, the current position of the light-receiving object is obtained based on the image coordinate system of the current scene. For example, coordinates of the light-receiving object in the image coordinate system represent the current position. The camera coordinate system is a coordinate system corresponding to the imaging device, which is different from the image coordinate system. Through the correspondence between the image coordinate system and the camera coordinate system, the coordinate system transforming is performed on the current position to obtain the target position of the light-receiving object in the camera coordinate system. For example, based on the correspondence between the image coordinate system of the current scene and the camera coordinate system, the coordinates of the light-receiving object in the image coordinate system of the current scene may be converted to the coordinates in the camera coordinate system, and the target position of the light-receiving object in the camera coordinate system is obtained. It should be noted here that the above-mentioned imaging device is a virtual camera.

It should also be noted that the target position of the light-receiving object in the camera coordinate system needs to be obtained, since the colorized image of the light-receiving object is processed with reference to the lighting-color map of the camera device, and the lighting-color map of the imaging device is obtained during the process of imaging by the imaging device the imaging range corresponding to the imaging direction of the imaging device. The lighting-color map represents the lighting situation of each light source in the imaging range corresponding to the imaging direction, and the imaging range corresponding to the imaging direction of the imaging device is based on the camera coordinate system, which means that coordinates of each pixel in the lighting-color map is represented based on the camera coordinate system, so it is necessary to obtain the target position of the light-receiving object in the camera coordinate system, to perform the lighting processing on the colorized image based on the lighting-color map in the same coordinate system.

In S13, a lighting-color map of the imaging device is obtained, in which the lighting-color map is generated based on attributes of the light source in the current scene, and the lighting-color map is configured to represent a lighting situation of the light source in the current scene.

In S14, a lighting image of the light-receiving object is obtained by processing the colorized image based on the target position and the lighting-color map of the imaging device, in which the lighting image is an image reflecting a display effect of the light-receiving object after being lighted by the light source.

In some embodiments of the disclosure, the lighting-color map is generated based on the attributes of the light source in the current scene, the attributes of the light source include the position and orientation of the light source in the current scene, and the lighting-color map may change when the attributes of the light source change. That is, the lighting-color map varies with the light source. Therefore, the lighting situation represented by the lighting-color map is consistent with the actual lighting situation of the light source in the current scene, thus the colorized image can be processed based on the lighting-color map representing the actual lighting situation. The processing of the colorized image is consistent with the lighting situation of the target position where the light-receiving object is located, so that the display effect of the light-receiving object after being lighted by the light source, reflected in the lighting image, is consistent with the effect shown when the light-receiving object is lighted by the light source in the current scene, thereby improving the photorealistic rendering.

In some embodiments, one way to process the colorized image based on the target position and the lighting-color map of the imaging device includes: obtaining lighting-color information of the target position by sampling the lighting-color map based on the target position; and obtaining the lighting image by adding the lighting-color information to the colorized image.

The lighting-color information obtained by sampling is color information of a pixel pointed by the target position in the lighting-color map. If the target position is represented by coordinates, and each pixel in the lighting-color map is also represented by coordinates, the pixel with the same coordinates as the target position can be determined through a coordinate comparison manner, and the color information of the pixel can be obtained. Since the target position is the position of the light-receiving object in the camera coordinate system, the lighting-color information at the target position in the lighting-color map can be determined by matching the target position, and the lighting-color information is used to represent the lighting situation of the target position.

After the lighting-color information is obtained, the lighting-color information is superimposed on the colorized image to obtain the lighting image that can reflect the lighting situation of the target position, so that the lighting image of the light-receiving object is consistent with the lighting situation of the target position, and the photorealistic rendering is improved. The one-to-one superposition manner is used to superimpose the lighting-color information into the colorized image, and the so-called one-to-one superposition manner is to superimpose the lighting-color information to the pixel in the colorized image that match the target position. The target position is obtained based on the current position of the light-receiving object in the image coordinate system of the current scene and the camera coordinate system. The current position of the light-receiving object in the image coordinate system of the current scene is represented by the position of each pixel of the light-receiving object, so the target position is the position of each pixel of the light-receiving object in the camera coordinate system. After the position of each pixel of the light-receiving object in the camera coordinate system is obtained, the lighting-color information at the corresponding position of each pixel can be extracted from the lighting-color map, and then the lighting-color information at the corresponding position of each pixel is superimposed on the corresponding pixel by the one-to-one superposition manner to obtain the lighting situation of each pixel.

In some embodiments of the disclosure, when processing the colorized image based on the target position and the lighting-color map, the lighting-color information matching the target position in the lighting-color map can be sampled by means of a sampling instruction, so as to superimpose the lighting-color information. According to embodiments of the disclosure, the lighting-color information can be directly obtained by sampling, and the rendering can be performed, which reduces the rendering duration.

In embodiments of the disclosure, the colorized image of the light-receiving object is obtained by performing the shading operation on the light-receiving object in the current scene. The lighting image of the light-receiving object is obtained by processing the colorized image based on the target position of the light-receiving object in the camera coordinate system and the lighting-color map of the imaging device generated based on the attributes of the light source in the current scene. According to the embodiments of the disclosure, the lighting processing is performed on the colorized image based on the lighting-color map, without performing the lighting processing on the colorized image pixel-by-pixel, to shorten the rendering duration and improve the real-time performance of lighting calculation. The lighting-color map is generated based on the attributes of the light source in the current scene, and the lighting situation of the light source in the current scene can be represented by the lighting-color map, so that the lighting-color map for the lighting processing of the colorized image varies with the attributes of the light source in the current scene, and the lighting situation of the light source represented by the lighting-color map is consistent with the lighting situation of the light source in the current scene, thus the display effect of the light-receiving object after being lighted by the light source, reflected by the lighting image, is consistent with the display effect when the light-receiving object in the current scene is lighted by the light source, thereby improving the photorealistic rendering.

Figure 2:
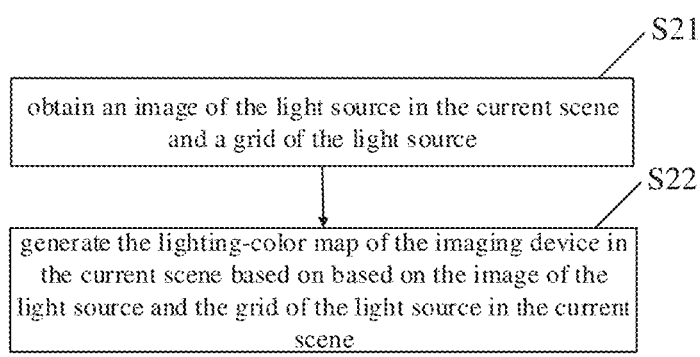
FIG. 2 is a flowchart of generating a lighting-color map according to an embodiment.

In some embodiments of the disclosure, the lighting-color map may be generated based on the attributes of the light source in the current scene. FIG. 2 is a flowchart of generating a lighting-color map according to an embodiment, which may include the following S21 and S22.

In S21, an image of the light source in the current scene and a grid of the light source are obtained, in which the image of the light source is configured to represent a color of the light source, and the grid of the light source is configured to indicate an area where the light source is set in the current scene.

Figure 3:
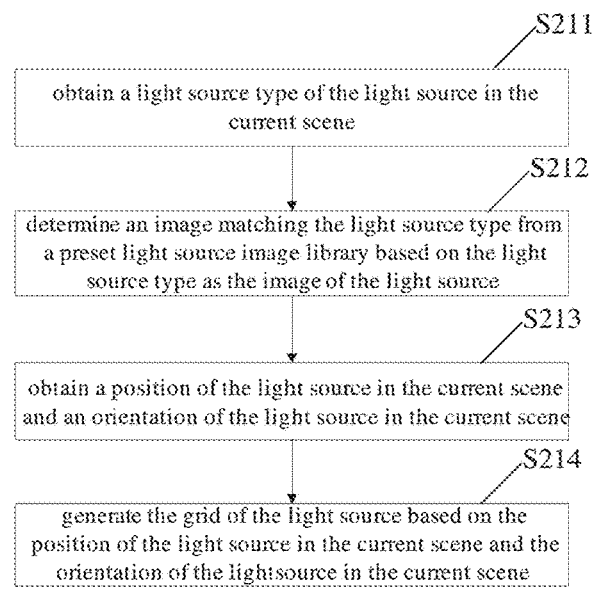
FIG. 3 is a flowchart of obtaining an image corresponding to a light source and a grid corresponding to a light source in a method for processing an image according to an embodiment.

In some embodiments, the manner of obtaining the image corresponding to the light source and the grid corresponding to the light source is shown in FIG. 3, which is not limited to the following S211, S212, S213 and S214.

In S211, a light source type of the light source in the current scene is obtained.

The light source type is configured to indicate a type of the light source. For example, the light source type includes at least one type of street light, torch and car light. For light sources of different light source types, the color of the light sources may be different, in which the color of the light source is represented by the image corresponding to the light source. Therefore, it is necessary to obtain the light source type first before finding the corresponding image according to the light source type.

In S212, an image matching the light source type is determined from a preset light source image library based on the light source type as the image of the light source.

The image corresponding to the light source is configured to represent the color of the light source. It should be noted that images of different light source types are stored in the preset light source image library. The storage manner includes but is not limited to storing by the correspondence between the light source type and the image corresponding to the light source, or using the light source type as the label of the image corresponding to the light source, so that after the light source type is obtained, a matching image can be found from the preset light source image library as the image corresponding to the light source indicated by the light source type.

For light sources of the same light source type, the intensity of the light sources may be different, and the color of the light sources may also be different. In the process of generating the image corresponding to the light source, according to embodiments of the disclosure, an image that matches the intensity is generated based on the intensity of the light source, and the image of the light source corresponds to the light source type and the intensity of the light source. In this way, the image corresponding to the light source can be classified based on the light source type and the intensity of the light source, so that in the process of generating the lighting-color map, the intensity of the light source can also be obtained, so as to obtain the matching image from the preset light source image library based on the intensity of the light source and the light source type. The matching images obtained from the preset light source image library can be obtained by the following manners.

The intensity of the light source may be different in many cases. In embodiments of the disclosure, the intensity of the light source may be graded. For example, the intensity of the light source of the same light source type is divided into grades 1 to N (N is a natural number greater than 1). For any grade, an image matching the grade is generated, so that after obtaining the intensity of the light source in the current scene, the grade of the intensity of the light source is determined, and the image corresponding to the grade of the intensity of the light source is obtained from the preset light source image library. Light sources such as street lights and car lights that change little or remains the same with the change of the air flow are regarded as fixed light sources. An image of a fixed light source is stored in the preset light source image library to represent the color of the light source. For a light source such as a flame, the light of the flame changes with the flow of air, and this light source can be regarded as a variable light source. Since the color of the light source may also change after the flame changes with the air flow, there are multiple images of the variable light source stored in the preset light source image library. Each image corresponds to a variation situation of light with the air flow and each image corresponds to a time point. For the variable light source, when obtaining an image matching the variable light source from the preset light source image library, an image whose time point matches the current time point is obtained from the multiple images of the variable light source as the image of the variable light source in the current scene.

In S213, a position of the light source in the current scene and an orientation of the light source in the current scene are obtained.

The orientation of the light source in the current scene represents the lighting direction of the light source. In some embodiments of the disclosure, one representation of the position and orientation is provided as follows.

The position of the light source in the current scene is represented by coordinates of at least three boundary points, in the area where the light source is set, in the current scene, and the orientation of the light source in the current scene is represented by a normal vector of the plane where the at least three boundary points of the light source are located. The at least three boundary points are used to define a plane, and the three boundary points define the area of the light source.

In S214, the grid of the light source is generated based on the position of the light source in the current scene and the orientation of the light source in the current scene.

In some embodiments of the disclosure, the grid corresponding to the light source may be used to indicate the area in which the light source is set in the current scene. One representation of the position and orientation is provided as follows. The position of the light source in the current scene is represented by the coordinates of the at least three boundary points, in the area where the light source is set, in the current scene, and the orientation of the light source in the current scene is represented by the normal vector representation of the plane where the three boundary points are located.

The grid corresponding to the light source is generated by: determining the coordinates of the at least three boundary points in the current scene as coordinates of at least three boundary points in the grid; determining the normal vector representing the orientation of the light source in the current scene as a normal vector of the grid; and constructing the grid of the light source based on the the coordinates of the at least three boundary points in the grid and the normal vector of the grid. For example, the coordinates of the three boundary points in the grid and the normal vector of the grid are used to determine a plane, that is, to determine a plane whose normal vector is the normal vector of the grid and contains the coordinates of the three boundary points in the grid. The coordinates of the three boundary points are used as three vertices, and a rectangular area is determined from the screen based on these three vertices, and the rectangular area in the plane can be used as the grid corresponding to the light source.

For example, when the area where the light source is set is an irregular polygon, the position of the light source in the current scene is represented by coordinates of multiple boundary points in the area where the light source is set in the current scene, and the number of boundary points is greater than three. The boundaries of the area where the light source is arranged can be determined by the multiple boundary points. In this way, when the coordinates of the multiple boundary points are determined as the coordinates of the boundary points of the grid, the boundaries of the grid are determined by the multiple boundary points. For example, the area where the light source is set is an irregular quadrilateral, coordinates of the four boundary points (one type of boundary point) in the area where the light source is set in the current scene represent the position of the light source in the current scene, and the coordinates of these four boundary points are used as the coordinates of the four boundary points in the grid. The boundaries of the grid are determined by these four boundary points.

For example, when at least one boundary of the area where the light source is set has a radian, the position of the light source in the current scene includes, in addition to the coordinates of multiple boundary points in the current scene, a radian corresponding to a connection line between the two adjacent boundary points. The boundary line corresponding to the two adjacent boundary points is determined by the adjacent two boundary points and the corresponding radian, to obtain the boundary line corresponding to the boundary points, to generate the grid corresponding to the light source.

In S22, the lighting-color map of the imaging device in the current scene is generated based on the image of the light source and the grid of the light source in the current scene.

The lighting-color map is generated based on the image corresponding to the light source and the grid corresponding to the light source in the current scene, that is, based on the light source type, position and orientation of the light source in the current scene, so that the lighting situation represented by the lighting-color map is consistent with the actual lighting situation.

In some embodiments of the disclosure, the lighting-color map is generated in a feasible way by: determining the imaging direction of the imaging device; obtaining a light source image corresponding to the current scene by splicing images corresponding to all light sources in the current scene, and obtaining a light source grid corresponding to the current scene by splicing grids corresponding to all light sources in the current scene; and obtaining color information corresponding to the light source image by sampling the light source image in an imaging process of an imaging range corresponding to the imaging direction of the imaging device, and obtaining the lighting-color map by rendering the light source grid based on the color information.

In some embodiments, the imaging direction of the imaging device can be obtained based on the orientation of the light source in the current scene, for example, an orientation is obtained based on orientations of all light sources in the current scene, and this orientation is determined as the imaging direction. For example, the orientations of the light sources in the current scene are represented as normal vectors, a normal vector can be calculated based on the normal vectors of all light sources, and the direction indicated by this normal vector can be determined as the imaging direction. In the process of splicing the images corresponding to the light sources and splicing the grids corresponding to the light sources, two splicing operations can be performed simultaneously or sequentially, and the splicing sequences of the two splicing operations can be the same or different, which are not limited in embodiments of the disclosure.

During the process of imaging by the imaging device the imaging range corresponding to the imaging direction, the color information corresponding to the image of the light source is obtained by sampling the image of the light source through the fragment shader in the imaging device. Then, the lighting-color map is obtained by rendering (such as shading) the grid of the light source with the color information through the fragment shader, and the sampling and rendering process of the fragment shader may not be described in embodiments of the disclosure.

It can be seen from the above lighting-color map generation process that after the image of the light source and the grid of the light source of the current scene are obtained, the lighting-color map can be obtained by sampling the image of the light source and rendering the grid of the light source. The lighting situation is represented by the lighting-color map, which reduces the consumption of device resources in the process of generating the lighting-color map, especially the calculation amount, compared with the mathematical parameter description of the lighting-color map in the related art, thus the consumption of device resources due to the excessive calculation amount is reduced. The imprecise light source can be described by the lighting-color map, for the following reasons.

Accurate light sources refer to point lights, spot lights and parallel lights. Taking a point light source as an example, the point light source is represented by a particle, the particle exists in a mathematical sense, and a mathematical parameter formula describes the light source in this mathematical sense. In other words, the mathematical parameter formula can be used to describe the light source without area. An imprecise light source is a light source with an area. For example, a ceiling lamp is installed on the ceiling at home. This ceiling lamp is in a shape of lotus leaf. Every time the light is turned on, a lotus leaf shape is projected on the floor. This is an energy (photon) emission process, photons are emitted from various parts of the lotus-leaf-shaped ceiling lamp, and it is difficult to describe the shape of the lotus leaf by the mathematical parameter formula. If the shape of this lotus leaf is described, it may involve extremely complex calculations in the lighting process. The light source is described by a lighting-color map, so that the description of the light source has an area. Therefore, the lighting-color map in embodiments of the disclosure can describe the imprecise light source.

Since the lighting-color map is generated based on the attributes of the light source, as described above, such as the light source type of the light source, the position and the orientation of the light source, when the light source in the scene changes, such as at least one of the attributes of the position and orientation of the light source changes, and/or the light source type of the light source in the scene changes, the lighting situation of the corresponding light source also changes. Therefore, in order to make the lighting situation represented by the lighting-color map consistent with the actual lighting situation, the lighting-color map also needs to follow the changes in the attributes of the light source in the scene. Correspondingly, the method for processing the image in embodiments of the disclosure may further include: monitoring the attributes of the light source in the current scene; and updating the lighting-color map of the imaging device in the current scene, in response to monitoring that the attributes of the light source changes, based on the attributes of the light source after change. The updating process may be regarded as a process of regenerating the lighting-color map, and the updating process may be performed with reference to the above-mentioned manner of generating the lighting-color map, which will not be repeated herein.

Figure 4:
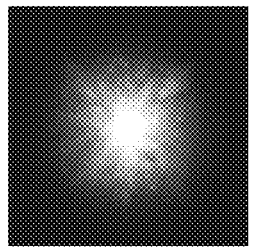
FIGS. 4 and 5 are schematic diagrams of images of two light sources respectively.
Figure 5:
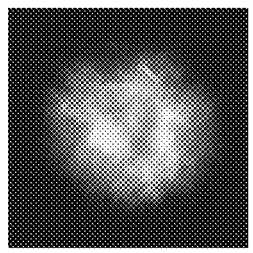
Figure 6:
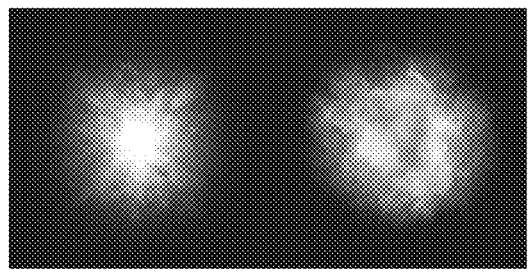
FIG. 6 is a schematic diagram of an image of a light source in a current scene.
Figure 7:
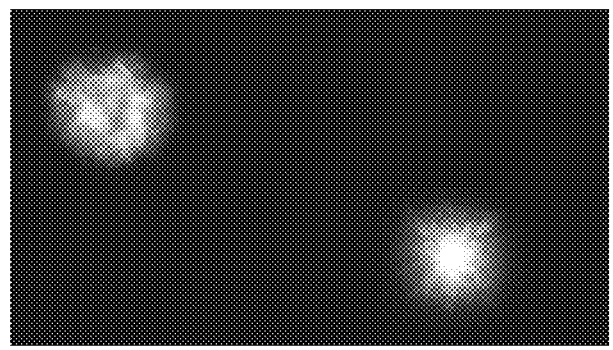
FIG. 7 is a schematic diagram of a lighting-color map of a current scene.
Figure 8:
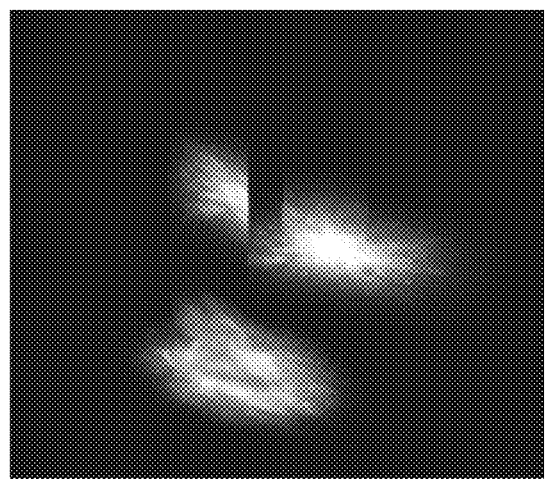
FIG. 8 is a schematic diagram of a lighting image of a light-receiving object in a current scene.

The method for processing an image according to the disclosure will be described below with reference to an example. The current scene is an internal structure of a house, and two pillars are erected on the ground of the house. When there is no light source in the current scene, the current scene is in a complete black state. If the current scene switches from no light source lighting to light source lighting, and there are two light sources for lighting, the images corresponding to the two light sources in the current scene are shown in FIG. 4 and FIG. 5. The images corresponding to the two light sources in the current scene are spliced to obtain the image of the light source of the current scene shown in FIG. 6. Based on the image of the light source of the current scene shown in FIG. 6, the lighting-color map shown in FIG. 7 is obtained, and the two pillars in the house and the ground can be used as light-receiving objects. In embodiments of the disclosure, the colorized image of the two pillars and the ground contacting the pillars is processed by using the lighting-color map shown in FIG. 7, to obtain the lighting image of the two pillars and the ground, to reflect the display effect after the light source lights the two pillars and the ground and the pillars and the ground are lighted by the light source, and reflect the display change situation of the light-receiving objects in the current scene. FIG. 8 shows the lighting image containing two pillars and the ground, which reflects the display effect after the pillars and the ground are lighted by the light source.

Figure 9:
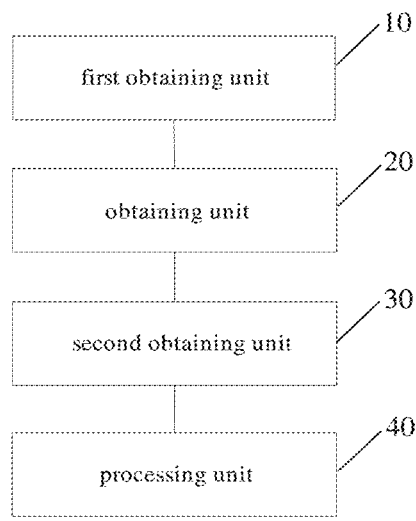
FIG. 9 is a block diagram of an apparatus for processing an image according to an embodiment.

FIG. 9 is a block diagram of an apparatus for processing an image according to an embodiment. The apparatus may include: a first obtaining unit 10, an obtaining unit 20, a second obtaining unit 30 and a processing unit 40.

The first obtaining unit 10 is configured to obtain a colorized image of a light-receiving object in a current scene by performing a shading operation on the light-receiving object, to reflect the shading effect of the light-receiving object based on the colorized image.

The obtaining unit 20 is configured to obtain a target position of a current position of the light-receiving object in a camera coordinate system based on the current position of the light-receiving object in an image coordinate system of the current scene, in which an imaging direction of an imaging device points to a lighting direction of a light source in the current scene, and the light-receiving object is located in an imaging range of the imaging device.

The coordinates of the light-receiving object in the image coordinate system represents the current position. The obtaining unit 20 converts the coordinates of the light-receiving object in the image coordinate system of the current scene into the coordinates in the camera coordinate system based on the correspondence between the image coordinate system of the current scene and the camera coordinate system, to obtain the target position of the light-receiving object in the camera coordinate system.

The target position of the light-receiving object in the camera coordinate system needs to be obtained, since the colorized image of the light-receiving object is processed with reference to the lighting-color map of the camera device, and the lighting-color map of the imaging device is obtained during the process of imaging by the imaging device the imaging range corresponding to the imaging direction of the imaging device. The lighting-color map represents the lighting situation of each light source in the imaging range corresponding to the imaging direction, and the imaging range corresponding to the imaging direction of the imaging device is based on the camera coordinate system, which means that coordinates of each pixel in the lighting-color map is represented based on the camera coordinate system, so it is necessary to obtain the target position of the light-receiving object in the camera coordinate system, to perform the lighting processing on the colorized image based on the lighting-color map in the same coordinate system.

The second obtaining unit 30 is configured to obtain a lighting-color map of the imaging device, in which the lighting-color map is generated based on attributes of the light source in the current scene, and the lighting-color map is configured to represent a lighting situation of the light source in the current scene.

The processing unit 40 is configured to obtain a lighting image of the light-receiving object by processing the colorized image based on the target position and the lighting-color map of the imaging device, in which the lighting image is an image reflecting a display effect of the light-receiving object after being lighted by the light source.

In a possible implementation, the processing unit 40 is configured to obtain lighting-color information of the target position by sampling the lighting-color map based on the target position; and obtain the lighting image by adding the lighting-color information to the colorized image. The lighting-color information is added to the colorized image to obtain the lighting image.

In embodiments of the disclosure, the colorized image of the light-receiving object is obtained by performing the shading operation on the light-receiving object in the current scene. The lighting image of the light-receiving object is obtained by processing the colorized image based on the target position of the light-receiving object in the camera coordinate system and the lighting-color map of the imaging device generated based on the attributes of the light source in the current scene. According to the embodiments of the disclosure, the lighting processing is performed on the colorized image based on the lighting-color map, without performing the lighting processing on the colorized image pixel-by-pixel, to shorten the rendering duration and improve the real-time performance of lighting calculation.

The lighting-color map is generated based on the attributes of the light source in the current scene, and the lighting situation of the light source in the current scene can be represented by the lighting-color map, so that the lighting-color map for the lighting processing of the colorized image varies with the attributes of the light source in the current scene, and the lighting situation of the light source represented by the lighting-color map is consistent with the lighting situation of the light source in the current scene, thus the display effect of the light-receiving object after being lighted by the light source, reflected by the lighting image, is consistent with the display effect when the light-receiving object in the current scene is lighted by the light source, thereby improving the photorealistic rendering.

Figure 10:
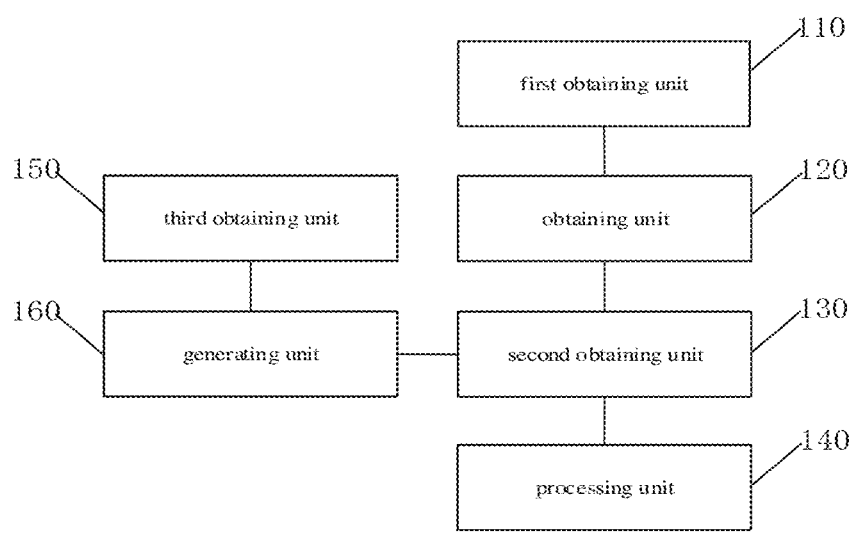
FIG. 10 is a block diagram of another apparatus for processing an image according to an embodiment.

FIG. 10 is a block diagram of another apparatus for processing an image according to an embodiment. The apparatus may further include: a third obtaining unit 150 and a generating unit 160.

The third obtaining unit 150 is configured to obtain an image of the light source in the current scene and a grid of the light source, in which the image of the light source is configured to represent a color of the light source, and the grid of the light source is configured to indicate an area where the light source is set in the current scene. Optionally, the third obtaining unit includes: a first obtaining sub-unit, an image determining sub-unit, a second obtaining sub-unit, and a grid generating sub-unit.

The first obtaining sub-unit is configured to obtain a light source type of the light source in the current scene.

The image determining sub-unit is configured to determine an image matching the light source type from a preset light source image library based on the light source type as the image of the light source.

The second obtaining sub-unit is configured to obtain a position of the light source in the current scene and an orientation of the light source in the current scene.

The grid generating sub-unit is configured to generate the grid of the light source based on the position of the light source in the current scene and the orientation of the light source in the current scene.

The position of the light source in the current scene is represented by coordinates of at least three boundary points, in the area where the light source is set, in the current scene, the orientation of the light source in the current scene is represented by a normal vector of a plane where the at least three boundary points are located. Correspondingly, the grid generating sub-unit is configured to: determine the coordinates of the at least three boundary points in the current scene as coordinates of at least three boundary points in the grid; determine the normal vector representing the orientation of the light source in the current scene as a normal vector of the grid; and construct the grid of the light source based on the coordinates of the at least three boundary points in the grid and the normal vector of the grid.

The generating unit 160 is configured to: generate the lighting-color map of the imaging device in the current scene based on the image of the light source and the grid of the light source in the current scene. In a possible implementation, the generating unit 160 is configured to: determine the imaging direction of the imaging device; obtain a light source image corresponding to the current scene by splicing images corresponding to all light sources in the current scene, and obtain a light source grid corresponding to the current scene by splicing grids corresponding to all light sources in the current scene; and obtain color information corresponding to the light source image by sampling the light source image in an imaging process of an imaging range corresponding to the imaging direction of the imaging device, and obtain the lighting-color map by rendering the light source grid based on the color information.

Since the lighting-color map is generated based on the attributes of the light source, as described above, such as the light source type of the light source, the position and the orientation of the light source, when the light source in the scene changes, such as at least one of the attributes of the position and orientation of the light source changes, and/or the light source type of the light source in the scene changes, the lighting situation of the corresponding light source also changes. Therefore, in order to make the lighting situation represented by the lighting-color map consistent with the actual lighting situation, the lighting-color map also needs to follow the changes in the attributes of the light source in the scene. Correspondingly, the method for processing the image in embodiments of the disclosure may further include: monitoring the attributes of the light source in the current scene; and updating the lighting-color map of the imaging device in the current scene, in response to monitoring that the attributes of the light source changes, based on the attributes of the light source after change. The updating process may be regarded as a process of regenerating the lighting-color map, and the updating process may be performed with reference to the above-mentioned manner of generating the lighting-color map, which will not be repeated herein.

Regarding the apparatus in the above-mentioned embodiments, the specific manner in which each unit and each sub-unit perform operations has been described in detail in the embodiments of the method, and will not be described in detail herein.

The embodiments of the disclosure further provide an electronic device, in which the electronic device includes: a processor and a memory for storing instructions executable by the processor. The processor is configured to execute the instructions to implement the method for processing the image in the embodiments of the disclosure.

The embodiments of the disclosure further provide a non-transitory computer-readable storage medium, in which instructions are stored in the storage medium, and when the instructions in the storage medium are executed by a processor, the processor can perform the method for processing the image in the embodiments of the disclosure. Optionally, the storage medium may be a non-transitory computer-readable storage medium, for example, the non-transitory computer-readable storage medium may be a read only memory (ROM), a random access memory (RAM), a CD-ROM, a magnetic tape, a floppy disk, and an optical data storage device.

The embodiments of the disclosure also provide a computer program product, in which when the product is running on a computer, the computer is enabled to execute the method for processing the image in the embodiments of the disclosure.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for processing an image, comprising:
obtaining a colorized image of a light-receiving object in a current scene by performing a shading operation on the light-receiving object;
obtaining a target position of a current position of the light-receiving object in a camera coordinate system based on the current position of the light-receiving object in an image coordinate system of the current scene, wherein an imaging direction of an imaging device points to a lighting direction of a light source in the current scene, and the light-receiving object is located in an imaging range of the imaging device;
obtaining a lighting-color map of the imaging device, wherein the lighting-color map is generated based on attributes of the light source in the current scene, and the lighting-color map is configured to represent a lighting situation of the light source in the current scene; and
obtaining a lighting image of the light-receiving object by processing the colorized image based on the target position and the lighting-color map of the imaging device, wherein the lighting image is an image reflecting a display effect of the light-receiving object after being lighted by the light source,
wherein the lighting-color map is generated based on the attributes of the light source in the current scene by:
obtaining an image of the light source in the current scene and a grid of the light source, wherein the image of the light source is configured to represent a color of the light source, and the grid of the light source is configured to indicate an area where the light source is set in the current scene; and
generating the lighting-color map of the imaging device in the current scene based on the image of the light source and the grid of the light source in the current scene,
wherein obtaining the image of the light source in the current scene and the grid of the light source comprises:
obtaining a light source type of the light source in the current scene;
determining an image matching the light source type from a preset light source image library based on the light source type as the image of the light source;
obtaining a position of the light source in the current scene and an orientation of the light source in the current scene; and
generating the grid of the light source based on the position of the light source in the current scene and the orientation of the light source in the current scene.

2. The method according to claim 1, wherein obtaining the lighting image of the light-receiving object by processing the colorized image based on the target position and the lighting-color map of the imaging device, comprises:
obtaining lighting-color information of the target position by sampling the lighting-color map based on the target position; and
obtaining the lighting image by adding the lighting-color information to the colorized image.

3. The method according to claim 1, wherein the position of the light source in the current scene is represented by coordinates of at least three boundary points, in the area where the light source is set, in the current scene, the orientation of the light source in the current scene is represented by a normal vector of a plane where the at least three boundary points are located, and generating the grid of the light source based on the position of the light source in the current scene and the orientation of the light source in the current scene comprises:

determining the coordinates of the at least three boundary points in the current scene as coordinates of at least three boundary points in the grid;

determining the normal vector representing the orientation of the light source in the current scene as a normal vector of the grid; and constructing the grid of the light source based on the coordinates of the at least three boundary points in the grid and the normal vector of the grid.

4. The method according to claim 1, further comprising:

monitoring the attributes of the light source in the current scene; and updating the lighting-color map of the imaging device in the current scene, in response to monitoring that the attributes of the light source changes, based on the attributes of the light source after change.

5. The method according to claim 1, wherein generating the lighting-color map of the imaging device in the current scene based on the image of the light source and the grid of the light source in the current scene, comprises:

determining the imaging direction of the imaging device;

obtaining a light source image corresponding to the current scene by splicing images corresponding to all light sources in the current scene, and obtaining a light source grid corresponding to the current scene by splicing grids corresponding to all light sources in the current scene; and obtaining color information corresponding to the light source image by sampling the light source image in an imaging process of an imaging range corresponding to the imaging direction of the imaging device, and obtaining the lighting-color map by rendering the light source grid based on the color information.

6. An electronic device, comprising:

a processor;

a memory for storing instructions executable by the processor;

wherein, the processor is configured to execute the instructions to perform:

obtaining a colorized image of a light-receiving object in a current scene by performing a shading operation on the light-receiving object;

obtaining a target position of a current position of the light-receiving object in a camera coordinate system based on the current position of the light-receiving object in an image coordinate system of the current scene, wherein an imaging direction of an imaging device points to a lighting direction of a light source in the current scene, and the light-receiving object is located in an imaging range of the imaging device;

obtaining a lighting-color map of the imaging device, wherein the lighting-color map is generated based on attributes of the light source in the current scene, and the lighting-color map is configured to represent a lighting situation of the light source in the current scene; and obtaining a lighting image of the light-receiving object by processing the colorized image based on the target position and the lighting-color map of the imaging device, wherein the lighting image is an image reflecting a display effect of the light-receiving object after being lighted by the light source, wherein the processor is further configured to execute the instructions to perform:

obtaining an image of the light source in the current scene and a grid of the light source, wherein the image of the light source is configured to represent a color of the light source, and the grid of the light source is configured to indicate an area where the light source is set in the current scene; and generating the lighting-color map of the imaging device in the current scene based on the image of the light source and the grid of the light source in the current scene, wherein the processor is further configured to execute the instructions to perform:

obtaining a light source type of the light source in the current scene;

determining an image matching the light source type from a preset light source image library based on the light source type as the image of the light source;

obtaining a position of the light source in the current scene and an orientation of the light source in the current scene; and generating the grid of the light source based on the position of the light source in the current scene and the orientation of the light source in the current scene.

7. The electronic device according to claim 6, wherein the processor is further configured to execute the instructions to perform:

obtaining lighting-color information of the target position by sampling the lighting-color map based on the target position; and obtaining the lighting image by adding the lighting-color information to the colorized image.

8. The electronic device according to claim 6, wherein the position of the light source in the current scene is represented by coordinates of at least three boundary points, in the area where the light source is set, in the current scene, the orientation of the light source in the current scene is represented by a normal vector of a plane where the at least three boundary points are located, and the processor is further configured to execute the instructions to perform:

determining the coordinates of the at least three boundary points in the current scene as coordinates of at least three boundary points in the grid;

determining the normal vector representing the orientation of the light source in the current scene as a normal vector of the grid; and constructing the grid of the light source based on the coordinates of the at least three boundary points in the grid and the normal vector of the grid.

9. The electronic device according to claim 6, wherein the processor is further configured to execute the instructions to perform:

monitoring the attributes of the light source in the current scene; and updating the lighting-color map of the imaging device in the current scene, in response to monitoring that the attributes of the light source changes, based on the attributes of the light source after change.

10. The electronic device according to claim 6, wherein the processor is further configured to execute the instructions to perform:

determining the imaging direction of the imaging device;

obtaining a light source image corresponding to the current scene by splicing images corresponding to all light sources in the current scene, and obtaining a light source grid corresponding to the current scene by splicing grids corresponding to all light sources in the current scene; and obtaining color information corresponding to the light source image by sampling the light source image in an imaging process of an imaging range corresponding to the imaging direction of the imaging device, and obtaining the lighting-color map by rendering the light source grid based on the color information.

11. A non-transitory computer readable storage medium having stored therein instructions that, when executed by a processor, the processor is caused to perform:

obtaining a colorized image of a light-receiving object in a current scene by performing a shading operation on the light-receiving object;

obtaining a target position of a current position of the light-receiving object in a camera coordinate system based on the current position of the light-receiving object in an image coordinate system of the current scene, wherein an imaging direction of an imaging device points to a lighting direction of a light source in the current scene, and the light-receiving object is located in an imaging range of the imaging device;

obtaining a lighting-color map of the imaging device, wherein the lighting-color map is generated based on attributes of the light source in the current scene, and the lighting-color map is configured to represent a lighting situation of the light source in the current scene; and obtaining a lighting image of the light-receiving object by processing the colorized image based on the target position and the lighting-color map of the imaging device, wherein the lighting image is an image reflecting a display effect of the light-receiving object after being lighted by the light source, when the instructions in the storage medium are executed by the processor, the processor is further caused to perform:

obtaining an image of the light source in the current scene and a grid of the light source, wherein the image of the light source is configured to represent a color of the light source, and the grid of the light source is configured to indicate an area where the light source is set in the current scene; and generating the lighting-color map of the imaging device in the current scene based on the image of the light source and the grid of the light source in the current scene, wherein when the instructions in the storage medium are executed by the processor, the processor is further caused to perform:

obtaining a light source type of the light source in the current scene;

determining an image matching the light source type from a preset light source image library based on the light source type as the image of the light source;

obtaining a position of the light source in the current scene and an orientation of the light source in the current scene; and generating the grid of the light source based on the position of the light source in the current scene and the orientation of the light source in the current scene.

12. The storage medium according to claim 11, wherein when the instructions in the storage medium are executed by the processor, the processor is further caused to perform:

obtaining lighting-color information of the target position by sampling the lighting-color map based on the target position; and obtaining the lighting image by adding the lighting-color information to the colorized image.

13. The storage medium according to claim 11, wherein when the instructions in the storage medium are executed by the processor, the processor is further caused to perform:

monitoring the attributes of the light source in the current scene; and updating the lighting-color map of the imaging device in the current scene, in response to monitoring that the attributes of the light source changes, based on the attributes of the light source after change.

14. The storage medium according to claim 11, wherein when the instructions in the storage medium are executed by the processor, the processor is further caused to perform:

determining the imaging direction of the imaging device;

obtaining a light source image corresponding to the current scene by splicing images corresponding to all light sources in the current scene, and obtaining a light source grid corresponding to the current scene by splicing grids corresponding to all light sources in the current scene; and obtaining color information corresponding to the light source image by sampling the light source image in an imaging process of an imaging range corresponding to the imaging direction of the imaging device, and obtaining the lighting-color map by rendering the light source grid based on the color information.

\* \* \* \* \*